(12) United States Patent
Joo

(10) Patent No.: US 9,037,831 B2
(45) Date of Patent: May 19, 2015

(54) MEMORY MANAGEMENT UNIT AND APPARATUSES HAVING SAME

(75) Inventor: Young Pyo Joo, Seoul (KR)

(73) Assignee: Samsung Electronics Co., Ltd. (KR)

(*) Notice: Subject to any disclaimer, the term of this patent is extended or adjusted under 35 U.S.C. 154(b) by 238 days.

(21) Appl. No.: 13/239,466

(22) Filed: Sep. 22, 2011

(65) Prior Publication Data

US 2012/0185668 A1 Jul. 19, 2012

(30) Foreign Application Priority Data

Jan. 17, 2011 (KR) .......................... 10-2011-004661

(51) Int. Cl.
*G06F 12/00* (2006.01)
*G06F 12/10* (2006.01)
(52) U.S. Cl.
CPC .................................. *G06F 12/1027* (2013.01)
(58) Field of Classification Search
USPC .......................................... 711/206, E12.059
See application file for complete search history.

(56) References Cited

U.S. PATENT DOCUMENTS

| | | | |
|---|---|---|---|
| 2005/0081020 A1 | 4/2005 | Volp | |
| 2007/0083680 A1 | 4/2007 | King et al. | |
| 2009/0198893 A1 | 8/2009 | Sorgard et al. | |
| 2009/0216994 A1* | 8/2009 | Hsieh et al. | 711/207 |
| 2009/0292899 A1* | 11/2009 | Mansell et al. | 711/207 |
| 2011/0107057 A1* | 5/2011 | Petolino, Jr. | 711/207 |
| 2011/0138149 A1* | 6/2011 | Karlsson et al. | 711/207 |

FOREIGN PATENT DOCUMENTS

KR 1020060120242 A 11/2006

* cited by examiner

*Primary Examiner* — Edward Dudek, Jr.
(74) *Attorney, Agent, or Firm* — Onello & Mello, LLP.

(57) ABSTRACT

The memory management unit includes a page table correlating respective virtual addresses with corresponding physical addresses, first translation lookaside buffer (TLB) lookup logic that provides one of a first virtual address and a first physical address according to whether a page number of the first virtual address matches a frame number of the first physical address, a first queue buffer that stores and provides the first virtual address, and second TLB lookup logic that determines and provides a first page physical address using the first virtual address to access the page table when the page number of the first virtual address does not match the frame number of the first physical address.

29 Claims, 9 Drawing Sheets

MEMORY MANAGEMENT UNIT AND APPARATUSES HAVING SAME

CROSS-REFERENCE TO RELATED APPLICATIONS

This application claims priority under 35 U.S.C. §119(a) from Korean Patent Application No. 10-2011-0004661 filed on Jan. 17, 2011, the subject matter of which is hereby incorporated by reference.

BACKGROUND OF THE INVENTION

The inventive concept relates to a memory management unit (MMU), and more particularly, to a memory management unit capable of hiding misses during the translation of virtual addresses into physical addresses The inventive concept is also related to apparatuses including this type of MMU.

Memory management units (MMUs) are components used to process memory access operations, such as the type requested by a direct memory access unit of a central processing unit (CPU). The MMU may be called a paged memory management unit (PMMU).

When the MMU has a multi-channel bus interface, various problems may be generated in the MMU due to a channel misses. For example, when the translation of a virtual address to a corresponding physical address misses for a particular channel of the MMU, a virtual address output from another channel must wait until the miss is correctly processed. It is desirable during operation of a MMU to reduce the time required to handle or further process a miss, thereby reducing the so-called miss penalty.

SUMMARY OF THE INVENTION

According to an aspect of the inventive concept, there is provided a memory management unit (MMU), comprising; a page table correlating respective virtual addresses with corresponding physical addresses, first translation lookaside buffer (TLB) lookup logic that provides one of a first virtual address and a first physical address according to whether a page number of the first virtual address matches a frame number of the first physical address, a first queue buffer that stores and provides the first virtual address, and second TLB lookup logic that determines and provides a first page physical address using the first virtual address to access the page table when the page number of the first virtual address does not match the frame number of the first physical address.

According to another aspect of the inventive concept, there is provided a processor comprising; a central processing unit (CPU) that provides a first virtual address, and a memory management unit (MMU) that translates the first virtual address into a corresponding first physical address. The MMU comprises; a page table correlating respective virtual addresses with corresponding physical addresses, first translation lookaside buffer (TLB) lookup logic that provides one of a first virtual address and a first physical address according to whether a page number of the first virtual address matches a frame number of the first physical address, a first queue buffer that stores and provides the first virtual address, and second TLB lookup logic that determines and provides a first page physical address using the first virtual address to access the page table when the page number of the first virtual address does not match the frame number of the first physical address.

According to another aspect of the inventive concept, there is provided a method of operating a memory management unit (MMU) within a processor, the method comprising; providing a page table correlating a read virtual address with a corresponding read physical address for read data stored in a memory, during a read operation executed by the processor, receiving the read virtual address and determining whether the read virtual address matches the read physical address, and if the read virtual address matches the read physical address, providing the read physical address as a translation for the read virtual address, else if the read virtual address does not match the read physical address storing the read virtual address in a first queue buffer, and providing a different read physical address in response to the queued read virtual address being used to access the page table.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION

Embodiments of the inventive concept will now be described in some additional detail with reference to the accompanying drawings. The inventive concept may, however, be embodied in many different forms and should not be construed as being limited to only the illustrated embodiments. Rather, the embodiments are provided so that this disclosure will be thorough and complete. Throughout the written description and drawings, like reference numbers and labels will be used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
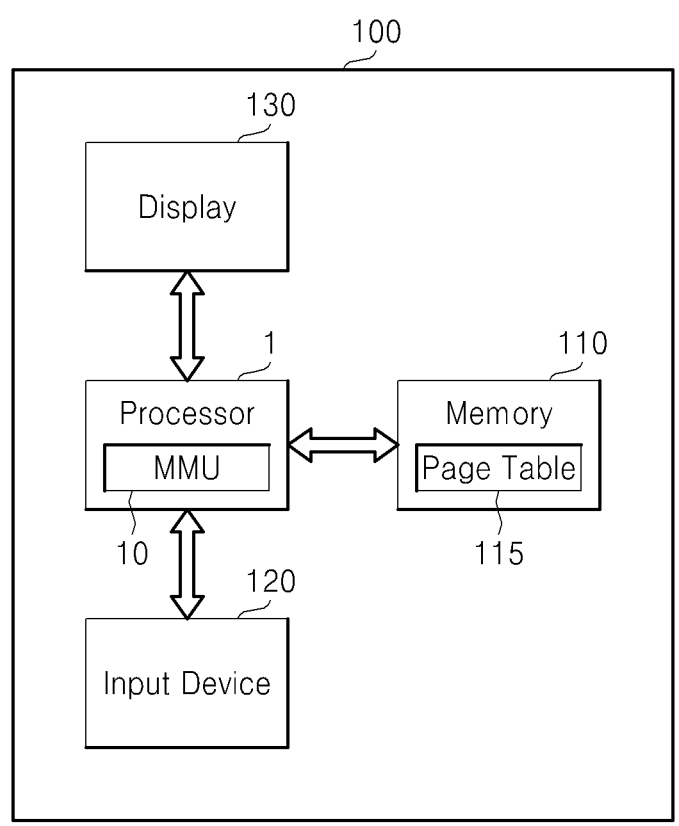
FIG. 1 is a block diagram illustrating an electronic device comprising a memory management unit (MMU) according to an embodiment of the inventive concept.

FIG. (FIG.) 1 is a block diagram illustrating in relevant portion an electronic device 100 comprising a memory management unit (MMU) according to an embodiment of the inventive concept. The block diagram of FIG. 1 is generally illustrative of many different types of electronic devices 100 having one or more data processing capabilities, such as personal computers (PCs), smart phones, tablet PCs, netbooks, e-readers, personal digital assistants (PDAs), portable multimedia players (PMPs), MP3 players, or MP4 players, etc.

The electronic device 100 comprises a processor 1 configured to control the operation of a memory 110 (e.g., a nonvolatile memory, such as a flash memory). As is conventionally understood, the processor 1 will generate one or more instructions (e.g., a sequence of instructions in many instances), in response to an externally applied or internally provided commands, that allow "input data" to be written (or programmed) to the memory 110 and/or "output data" to be retrieved from the memory 110. For example, the processor 1 may generate instructions sufficient to obtain input data from an input device 120, and then store the input data in the memory 110. Thereafter, the processor 1 may generate instructions sufficient to retrieve the stored input data (now, as output data), and display an image on a display 130 defined by the output data.

The input device 120 may be embodied by a pointing device such as a touch pad or a computer mouse, a key pad, a keyboard, etc. The display 130 may be a CRT display, a LCD display, a LED display, etc. The processor 1 of FIG. 1 is shown incorporating a MMU 10, and the memory 110 is assumed to include a page table 115 associated with a multipage organization of constituent memory cells.

Figure 2:
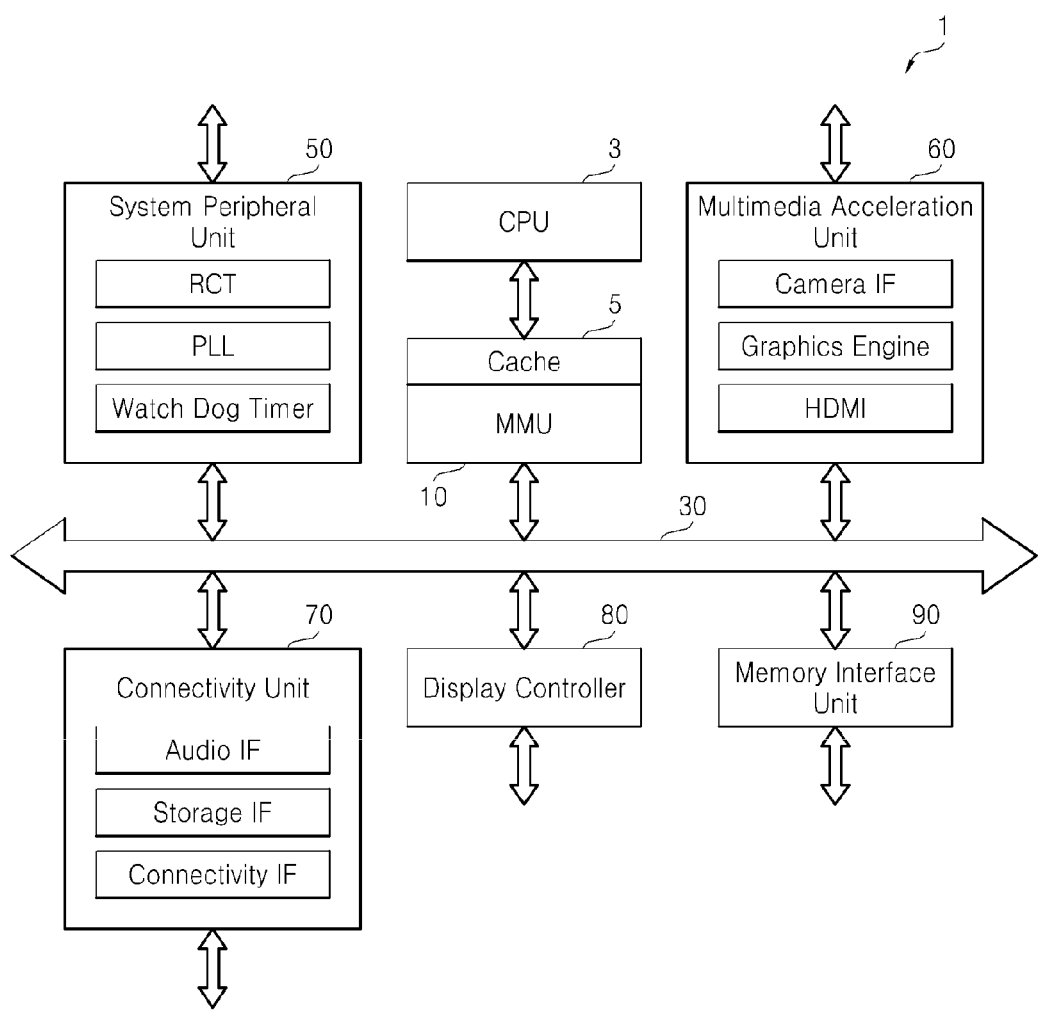
FIG. 2 is a block diagram further illustrating the processor of FIG. 1.

FIG. 2 is a block diagram further illustrating one possible example of the processor 1 shown in FIG. 1. Referring to FIGS. 1 and 2, the processor 1 comprises in relevant part a central processing unit (CPU) 3, a cache 5, and the MMU 10.

The CPU 3 is the computational/logical heart of the processor 1 that enables the receipt of externally applied commands and the corresponding generation of instructions controlling the operation of other components in the electronic device 100. The cache 5 is a memory used to store or queue instructions and/or data being exchanged between the CPU 3 and MMU 10. The MMU 10 is a component, implemented wholly or in part in hardware, that controls access to the memory 110 by the CPU 3.

The MMU 10 may be used to perform translation of virtual addresses into corresponding physical addresses, implementation of certain memory protection functions, control operation of the cache 5, control bus arbitration, control bank switching, etc.

In certain embodiments of the inventive concept, the processor 1 further comprises a system peripheral unit 50, a multimedia acceleration unit 60, a connectivity unit 70, a display controller 80, and a memory interface unit 90. The system peripheral unit 50, multimedia acceleration unit 60, connectivity unit 70, display controller 80, and memory interface unit 90 are respectively capable exchanging data and/or instructions via a system bus 30. The system bus 30 may include a plurality of channels (e.g., a read data channel, a read address channel, a write address channel, and/or a write data channel, etc.).

In certain embodiments of the inventive concept, the system peripheral unit 50 may include a real-time clock (RTC), a phase-locked loop (PLL), and a watch dog timer.

The multimedia acceleration unit 60 will typically include some sort of graphics engine. In the particular embodiment illustrated in FIG. 2, the multimedia acceleration unit 60 includes a camera interface (IF), a graphics engine integrated with a frame buffer or other video display circuitry for performing graphics calculation, and a high-definition multimedia interface (HDMI) serving as an audio/video interface to transmit uncompressed digital data. However, in other embodiments, the multimedia acceleration unit 60 may instead include an analog television encoding system, such as one compatible with national television system committee (NTSC) or phase alternate line (PAL) standards.

In certain embodiments of the inventive concept, the MMU 10 may be used to translate a virtual address output by the graphics engine of the multimedia acceleration unit 60 into a corresponding physical address.

The connectivity unit 70 may be configured to communicate with the input device 120 and may include an audio IF, a storage IF such as an advanced technology attachment (ATA), and a connectivity IF.

The display controller 80 may be configured to control the display of image data on the display 130. In certain embodiments, the MMU 10 may be used to translate a virtual address output by the display controller 80 into a corresponding physical address.

The memory interface unit 90 serves as an interface enabling access to the memory 110 in accordance with its defined operating characteristics. The memory 110 may include volatile memory, such as a DRAM, and/or nonvolatile memory, such as flash memory.

Figure 3:
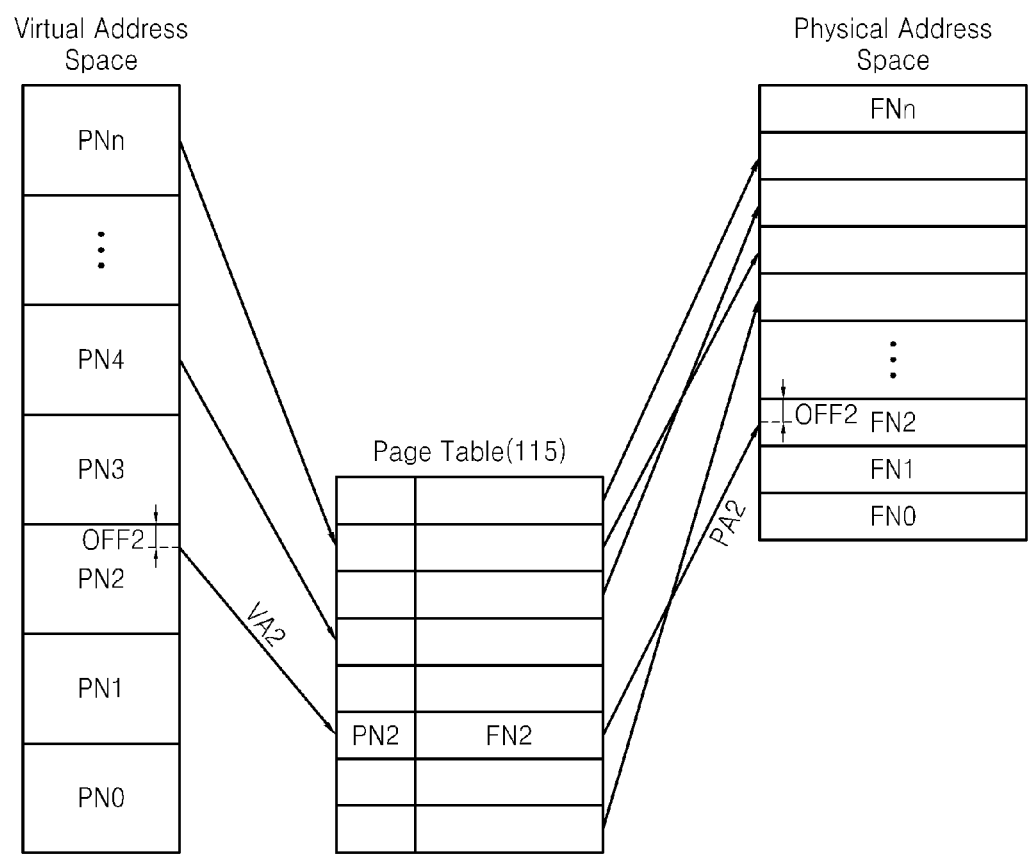
FIG. 3 is a conceptual diagram illustrating a mapping function between virtual address space and physical address space.

FIG. 3 is a conceptual diagram illustrating certain mapping functions accomplished by using a page table 115 of memory 110 that translates virtual address space into physical address space. Referring to FIGS. 1, 2 and 3, the virtual address space may be divided into a plurality of pages PN0-PNn. The pages PN0-PNn may be arranged in a sequence of adjacent blocks of virtual addresses. For example, each of the pages PN0-PNn may be a 4 Kbyte block of virtual addresses, but the size of each of the pages PN0-PNn may vary between embodiments. The physical address space may be similarly divided into a plurality of frames FN0-FNn, each having a fixed size.

In the example illustrated in FIG. 3, each page will be specifically identifiable by a page number (e.g., PN2) within the virtual address space and may be associated with (e.g., arranged in an ordered relationship with) one or more offset page(s) (e.g., OFF2). With this configuration, the division of the virtual address space may be expressed by Equation 1.

$$VAi = PNj + OFFk \quad \text{[Equation 1]}$$

Here, variables "i", "j", and "k" denote positive integers. The term "VAi" denotes a virtual address, "PNj" denotes a page number, and "OFFk" denotes an offset. Each page number PNj may be used as an index to the page table 115. Each offset OFFk may be used to define a physical address frame FNs corresponding to a virtual address page. With this configuration, a physical address may be expressed by Equation 2.

$$PAr = FNs + OFFk \quad \text{[Equation 2]}$$

Here, variable "r", "s", and "k" integers greater than or equal to 0. The term "PAr" denotes a physical address, "FNs" denotes a frame number, and "OFFk" denotes an offset.

With the following assumptions, each page number PNj may be referred to as a "virtual page number", and each frame number FNs may be referred to as a "physical frame number." Thus, the page table 115 may be seen as summarizing a mapping function between each virtual page number and a corresponding physical frame number. For example, FIG. 3 illustrates a specific relationship between a portion of virtual address space VA2 including a denominated third virtual page PN2 and third offset OFF2 and a corresponding portion of physical address space including a denominated third physical frame FN2 and third offset OFF2.

Figure 4:
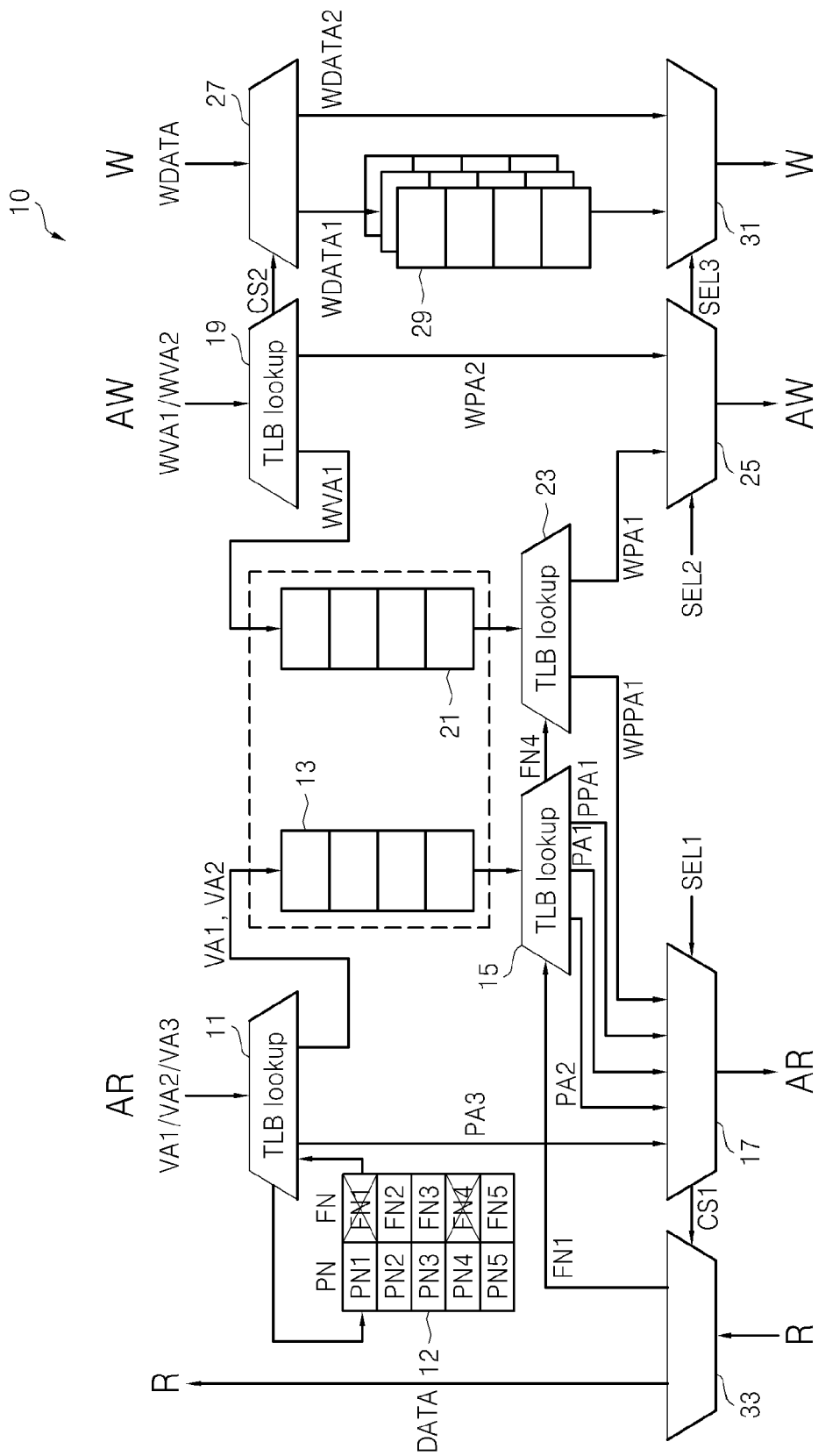
FIG. 4 is a block diagram further illustrating one possible embodiment of the MMU of FIG. 1.

FIG. 4 is a block diagram further illustrating one possible embodiment of the MMU 10 of FIG. 1. Referring to FIGS. 1 through 4, the MMU 10 comprises a plurality of channels including a read data channel (R), a read address channel (AR), a write address channel (AW), and a write data channel (W). For convenience of explanation, a write response channel is not illustrated. The MMU 10 also comprise a translation lookaside buffer (TLB) 12 storing information that correlates page numbers PN with frame numbers FN. Non-matching TLB entries are indicated in FIG. 4 by being crossed-out with an "X". During a read operation, the CPU 3 communicates a virtual address (e.g., VA1) associated with desired output to the MMU 10 via the read address channel AR.

The MMU 10 further comprises; first TLB lookup logic 11, a first queue buffer 13, second TLB lookup logic 15, and a first selector 17 (e.g., a multiplexer). When virtual address VA1 is applied to the MMU 10 via the read address channel AR, the first TLB lookup logic 11 uses the TLB 12 to determine whether or not the page number (e.g., PN1) associated with the virtual address VA1 matches a corresponding frame number (e.g., FN1).

In certain embodiments, the TLB 12 may be implemented, wholly or in part, in hardware in order to enhance the speed of virtual address translation (or page number PN to frame number FN mapping). When a page number does not match its corresponding frame number (PN1≠FN1), the first TLB lookup logic 11 outputs the "missed virtual address" (VA1 in the working example) to the first queue buffer 13. This type of non-match between page number and frame number is referred to as a "TLB miss".

The first queue buffer 13 temporarily stores and outputs the missed virtual address VA1. The first queue buffer 13 processes missed virtual address data on a first-in-first-out (FIFO) basis. In certain embodiments, the first queue buffer 13 may also store and output access identification (ID) corresponding to a missed virtual address. For example, in the embodiment illustrated in FIG. 4, the access ID for the missing virtual address VA1 including both second virtual address VA1 and third virtual address VA2), because the access ID of the third virtual address VA2 having the same ID as the access ID for the second virtual address VA1 must be successively processed by the MMU 10.

Also using TLB 12, the second TLB lookup logic 15 determines whether or not the page number PN1 of the virtual address VA1 output from the first queue buffer 13 matches the frame number FN1.

When the page number PN1 of the virtual address VA1 does not match the frame number FN1, a so-called page table walk (PTW) function is performed. The PTW is essentially a search routine to determine whether the page number PN1 of the virtual address VA1 and the frame number FN1 exist anywhere in the page table 115, when they do not match each other in the TLB 12. In this manner, the second TLB lookup logic 15 may determine a page physical address PPA1 using the virtual address VA1 to access the page table 115 and output same.

The page physical address PPA1 is an address that may be used to access the page table 115 as an index by combining the page number PN1 of the virtual address VA1 and an offset, (e.g., a page table pointer).

When the page number PN2 of the virtual address VA2 output from the first queue buffer 13 matches the frame number FN2 in the TLB 12, the second TLB lookup logic 15 translates the virtual address VA2 into the physical address PA2 and outputs the physical address PA2. When the page number PN2 of the virtual address VA2 matches the frame number FN2, it is referred to as a "TLB hit". When a page number PN3 of a virtual address, for example, VA3, matches a frame number FN3, the first TLB lookup logic 11 translates the virtual address VA3 into a physical address PA3 and outputs the physical address PA3 to the first selector 17.

The first selector 17, in response to the first selection signal SEL1, selects one of a plurality of physical addresses, for example, PA2, PA3, and PPA1 and outputs a selected physical address to the memory 110. The first selection signal SEL1 may be provided by control logic (not shown). The first selection signal SEL1 may be used to control the first selector 17 in order to selectively output the physical address PA3 after the physical addresses PA2 and PPA1 of the physical addresses PA2, PA3, and PPA1 are output. This is because, in view of time, the physical address PA2 translated from the virtual address VA2 or a transaction corresponding to the page physical address PPA1 is performed prior to a transaction corresponding to the physical address PA3 translated from the virtual address VA3. When the page physical address PPA1 accesses the page table 115 of the memory 110, the frame number FN1 is read.

A first demultiplexer 33, in response to a first control signal CS1 provided by the first selector 17, outputs the frame number FN1 read from the memory 110 to the second TLB lookup logic 15. The second TLB lookup logic 15 receives the frame number FN1, updates the TLB 12, translates the virtual address VA1 into the physical address PA1, and outputs the physical address PA1. The data stored in the physical address PA1 of the memory 110 is communicated to the processor 1 via the read data channel R.

When the CPU 3 programs write data (WDATA) to the memory 110, the CPU 3 communicates a write virtual address (WVA1) and first data (WDATA1) to the MMU 10 using the write address channel AW and the write data channel W, respectively.

The write data WDATA is to be stored in the memory 110. The write virtual address WVA1 denotes a virtual address corresponding to a location in the memory 110 at which the write data WDATA is to be stored. A write physical address (WPA1) is a corresponding address indicating the physical location at which the write data WDATA is stored in the memory 110.

The MMU 10 illustrated in FIG. 4 further comprises third TLB lookup logic 19, a second queue buffer 21, fourth TLB lookup logic 23, and a second selector 25 that may be used to translate the write virtual address WVA1 into the write physical address WPA1.

When the write virtual address WVA1 is applied to the MMU 10 via the write address channel AW, the third TLB lookup logic 19 uses TLB 12 to determine whether or not a page number PN4 of the write virtual address WVA1 matches a frame number FN4. When the page number PN4 of the write virtual address WVA1 does not match the frame number FN4, the third TLB lookup logic 19 outputs the write virtual address WVA1 to the second queue buffer 21.

The second queue buffer 21 temporarily stores and outputs the write virtual address WVA1. The second queue buffer 21 processes data on a FIFO basis like the first queue buffer 13. The fourth TLB lookup logic 23 may be used in conjunction with the TLB 12 to determine whether or not the page number PN4 of the write virtual address WVA1 output from the second queue buffer 21 matches the frame number FN4.

When the page number PN4 of the write virtual address WVA1 does not match the frame number FN4, a PTW is performed. That is, the fourth TLB lookup logic 23 determines the write page physical address WPPA1 using the write virtual address WVA1 to access the page table 115 and outputs the write page physical address WPPA1. The write page physical address WPPA1 is similar to the page physical address PPA1. The write page physical address WPPA1 is applied to the first selector 17.

When the write page physical address WPPA1 output from the first selector 17 accesses the page table 115, the frame number FN4 is read.

The first demultiplexer 33, in response to the first control signal CS1 output from the first selector 17, outputs the frame number FN4 read from the memory 110 to the fourth TLB lookup logic 23. The fourth TLB lookup logic 23 receives the frame number FN4, updates the TLB 12, translates the write virtual address WVA1 into the write physical address WPA1, and outputs the write physical address WPA1. The write physical address WPA1 is applied to the second selector 25.

When a write virtual address (WVA2) is applied to the MMU 10 via the write address channel AW, the third TLB lookup logic 19 determines using the TLB 12 whether a page number PN5 of the write virtual address WVA2 matches a frame number FN5 of a write physical address (WPA2). When the page number PN5 of the write virtual address WVA2 matches the frame number FN5, the third TLB lookup logic 19 translates the write virtual address WVA2 into the write physical address WPA2 and outputs the write physical address WPA2.

The second selector 25, in response to the second selection signal SEL2, outputs one of a plurality of write physical addresses (e.g., WPA1 or WPA2) to the memory 110. The second selection signal SEL2 is a signal controlling the second selector 25 to have the write physical address WPA2 output after the write physical address WPA1 is output.

The MMU 10 further comprises the second demultiplexer 27, the third queue buffer 29, and the third selector 31 in order to store some portion of the write data (e.g., WDATA1) in the memory 110. Each of the selectors 25 and 31 may be embodied by a multiplexer.

The second demultiplexer 27, in response to a second control signal CS2 output from the third TLB lookup logic 19, outputs the write data WDATA to any one of the third queue buffer 29 and the third selector 31.

When the third TLB lookup logic 19 cannot translate the write virtual address (e.g., WVA1) into the write physical address (WPA1) and a TLB miss is generated, the third TLB lookup logic 19 outputs the second control signal CS2 to control the second demultiplexer 27 to have the write data WDATA output to the third queue buffer 29 as the first write data WDATA 1. In contrast, when the third TLB lookup logic 19 translates the write virtual address (e.g., WVA2) into the write physical address (WPA2) and a TLB hit is generated, the third TLB lookup logic 19 outputs the second control signal CS2 to control the second demultiplexer 27 to have the write data WDATA output to the third selector 31 as a second write data WDATA2. The third queue buffer 29 stores and outputs the first write data WDATA1.

When a multichannel bus interface protocol does not support write interleaving, the third queue buffer 29 prevents the order of the write physical address and the write data respectively output from the write address channel AW and the write data channel W from being reversed.

The third selector 31, in response to a third selection signal SEL3 output from the second selector 25, outputs any one of a plurality of the write data, for example, WDATA1 and WDATA2.

The write data, for example, WDATA1, is stored in the write physical address, for example, WPA1, output via the write address channel AW.

Figure 5:
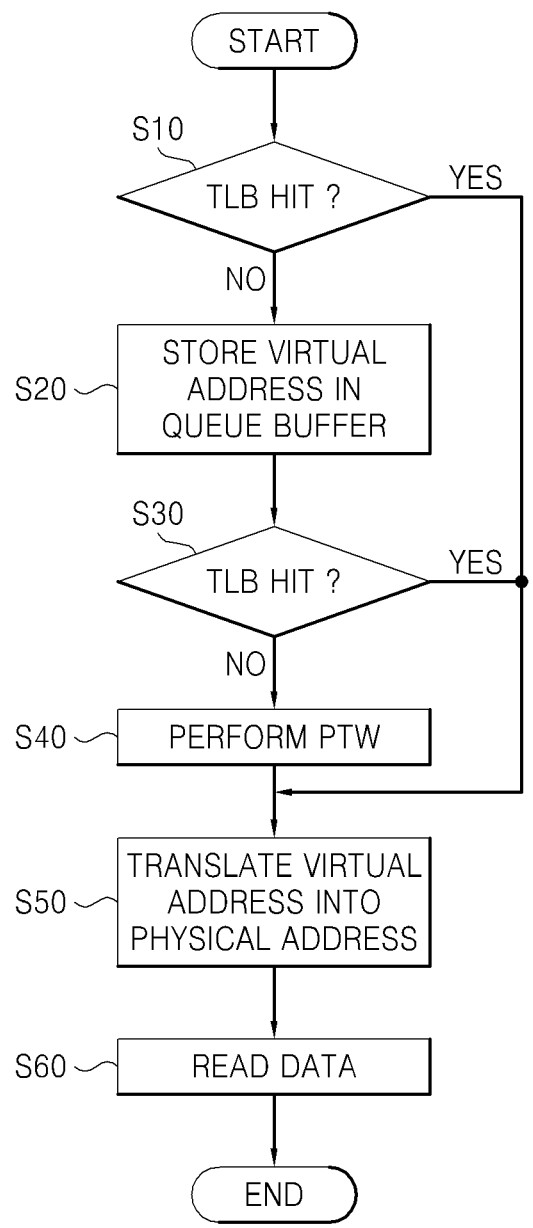
FIG. 5 is a flowchart summarizing one possible operation for the MMU of FIG. 1.

FIG. 5 is a flowchart summarizing one possible operation for the MMU 10 of FIG. 1. Referring to FIGS. 1 through 5, since the translation of a virtual address into a physical address by the MMU 10 is similar in an operation in which the processor 1 reads data from the memory 110 and an operation in which the processor 1 writes data to the memory 110, for convenience of explanation, the translation of a virtual address into a physical address by the MMU 10 when the processor 1 reads data from the memory 110 will be described below.

The first TLB lookup logic 11 determines using the TLB 12 whether the page number PN1 of the virtual address VA1 matches the frame number FN1 (S10). That is, the first TLB lookup logic 11 determines whether there is a TLB hit. When the page number PN1 of the virtual address VA1 does not match the frame number FN1, the first TLB lookup logic 11 outputs the virtual address VA1 to the first queue buffer 13. The first queue buffer 13 temporarily stored and outputs the virtual address VA1 (S20).

The second TLB lookup logic 15 determines using the TLB 12 whether the page number PN1 of the virtual address VA1 output from the first queue buffer 13 matches the frame number FN1 (S30). That is, the second TLB lookup logic 15 determines whether there is a TLB hit. When the page number PN1 of the virtual address VA1 does not match the frame number FN1, page table walk is performed (S40). That is, the second TLB lookup logic 15 determines and provides the page physical address PPA1 using the virtual address VA1 to access the page table 115. When the page physical address PPA1 accesses the page table 115 of the memory 110, the frame number FN1 is read.

The first demultiplexer 33, in response to the first control signal CS1 output from the first selector 17, outputs the frame number FN1 read from the memory 110 to the second TLB lookup logic 15. The second TLB lookup logic 15 receives the frame number FN1, updates the TLB 12, translates the virtual address VA1 into the physical address PA1, and outputs the physical address PA1 (S50). The data (DATA) stored in the physical address PA1 of the memory 110 is communicated to the processor 1 via the read data channel R (S60).

Figure 6:
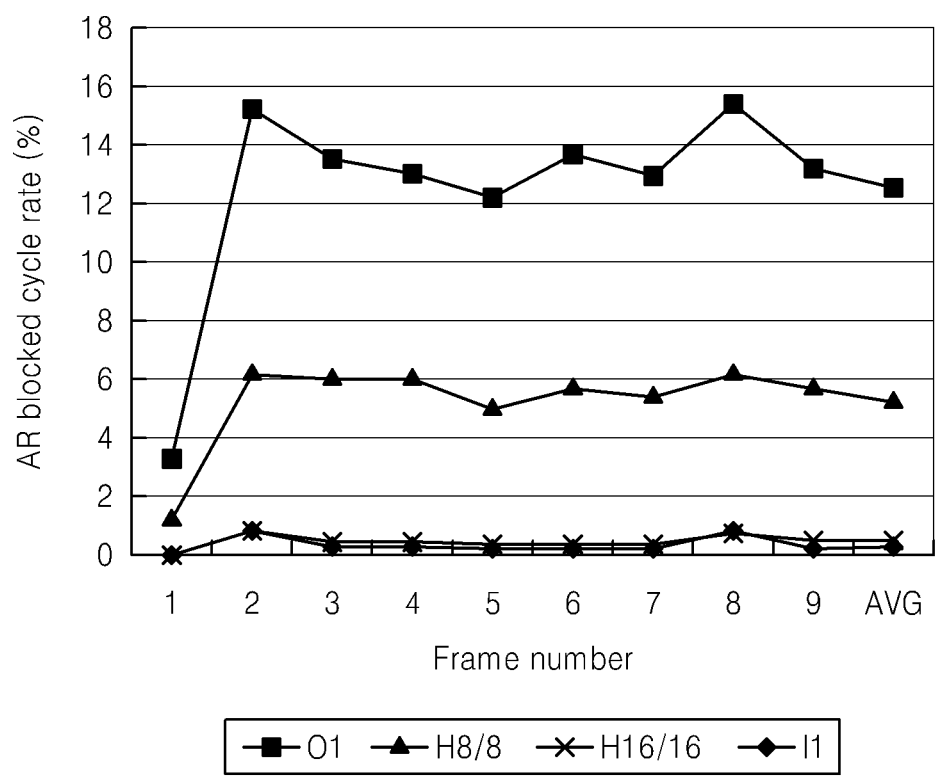
FIG. 6 is a graph showing simulation results for the MMU of FIG. 1.

FIG. 6 is a graph showing simulation results for a MMU like the one described above. Referring to FIG. 6, the X axis indicates a frame number, AVG of the X axis denotes an average of the entire time, and the Y axis indicates an AR blocked cycle rate. The frame number denotes time. The AR blocked cycle rate is a probability obtained by dividing a total of transaction waiting time by the entire time. The transaction denotes that a virtual address is input via the read address channel AR The AR blocked cycle rate is expressed by probability of time that the MMU 10 does not access the memory 110 and waits due to the page table walk or other transaction. As the AR blocked cycle rate decreases, the time for accessing the memory 110 decreases.

A line "O1" indicates a case of using a typical MMU, a line "H8/8" indicates a case of setting the size of each of the first queue buffer 13 and the second queue buffer 21 to 8, a line "H16/16" indicates a case of setting the size of each of the first queue buffer 13 and the second queue buffer 21 to 16, and a line "I1" indicates a case in which overhead due to PTW does not exist. Here, "8" and "16" indicate the number of virtual addresses.

In a case of "H8/8", the AR blocked cycle rate is reduced less than half of the case "O1". In a case of "H16/16", a block by the PTW is hardly generated.

Figure 7:
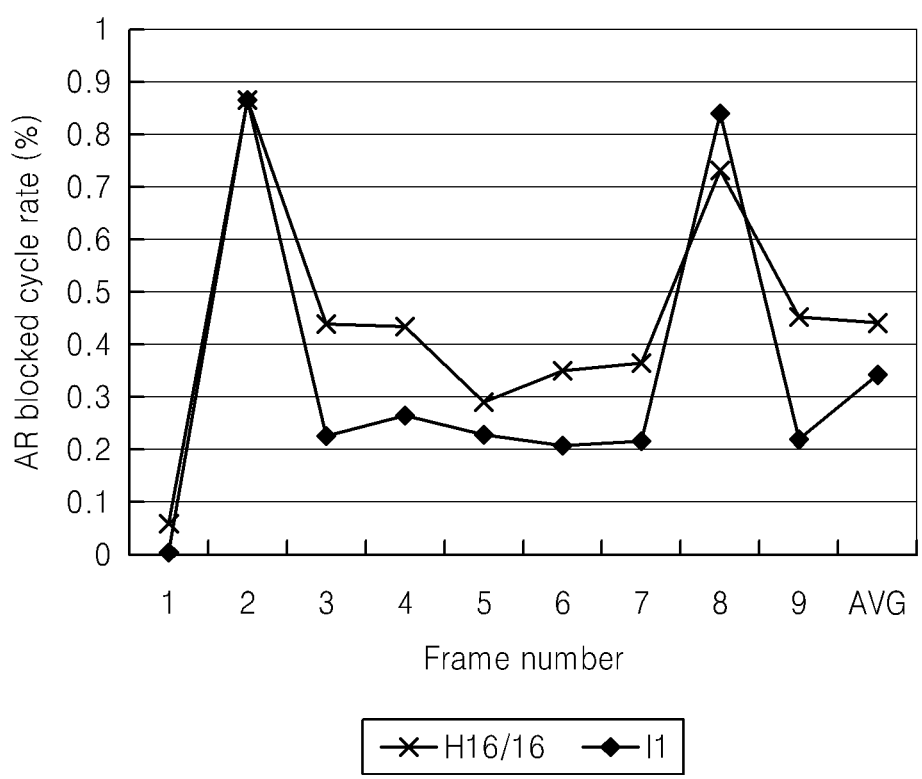
FIG. 7 is a graph showing additional simulation results for the MMU of FIG. 1.

FIG. 7 is a graph showing additional simulation results for a MMU 10 like the one described above. Referring to FIGS. 4 and 7, an operation that a transaction is blocked, that is, an input of a virtual address via the read address channel AR is blocked, is generated even when the PTW is not used (as shown by "I1" in FIG. 7). This is because a case may be generated in which a transaction may not be issued according to a limit in performance of a memory or the state of a bus, in addition to the PTW.

Figure 8:
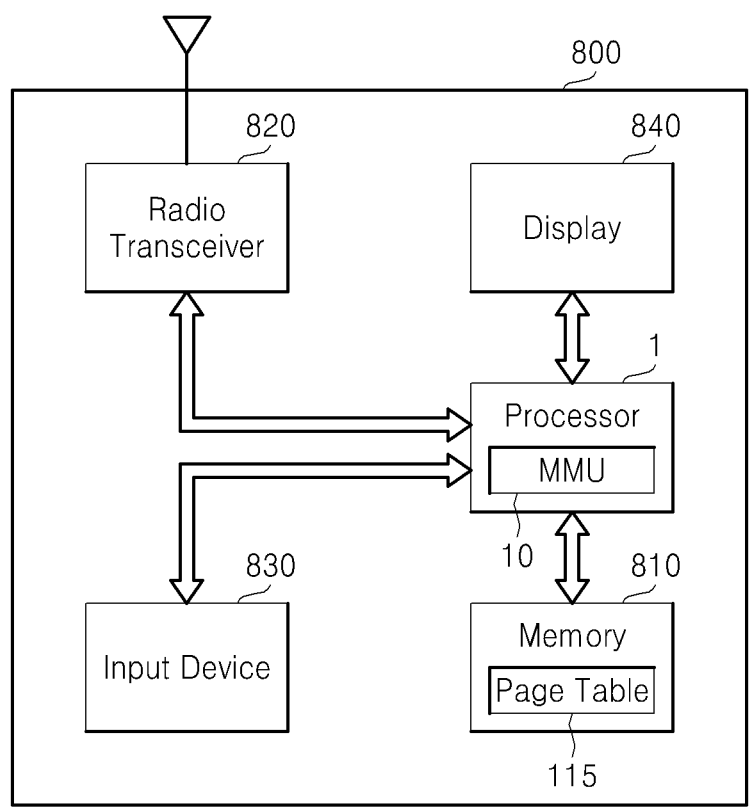
FIG. 8 is a block diagram illustrating another electronic device comprising a MMU according to an embodiment of the inventive concept.

FIG. 8 is a block diagram illustrating another electronic device 800 incorporating a processor 1 having an MMU 10 according to an embodiment of the inventive concept. Referring to FIG. 8, the electronic device 800 may be a cellular phone, smart phone, or wireless internet apparatus.

As before, the processor 1 includes MMU 10 that translates a virtual address into a physical address. The processor 1 accesses a physical address of a memory 810, reads data from the physical address of the memory 810, or writes data to the physical address of the memory 810.

A radio transceiver 820 may exchange radio signals through an antenna. For example, the radio transceiver 820 may convert radio signals received through the antenna to signals that may be processed by the processor 1. Thus, the processor 1 processes the signal output from the radio transceiver 820, translates a virtual address into a physical address, and stores processed signals in the physical address of the memory 810 as data. Also, the processed signals may be displayed through a display 840. The memory 810 includes a page table 115 to translate the virtual address into the physical address. Also, the radio transceiver 820 may covert the signals output from the processor 1 to radio signals and output converted radio signals to the outside through the antenna.

An input device 830 that is a device for inputting control signals to control an operation or data to be processed by the processor 1 may be embodied by a pointing device such as a touch pad or a computer mouse, a key pad, or a keyboard. The processor 1 may control an operation of the display 840 so that data output from the memory 810, radio signals output from the radio transceiver 820, or data output from the input device 830 may be displayed through the display 840.

Figure 9:
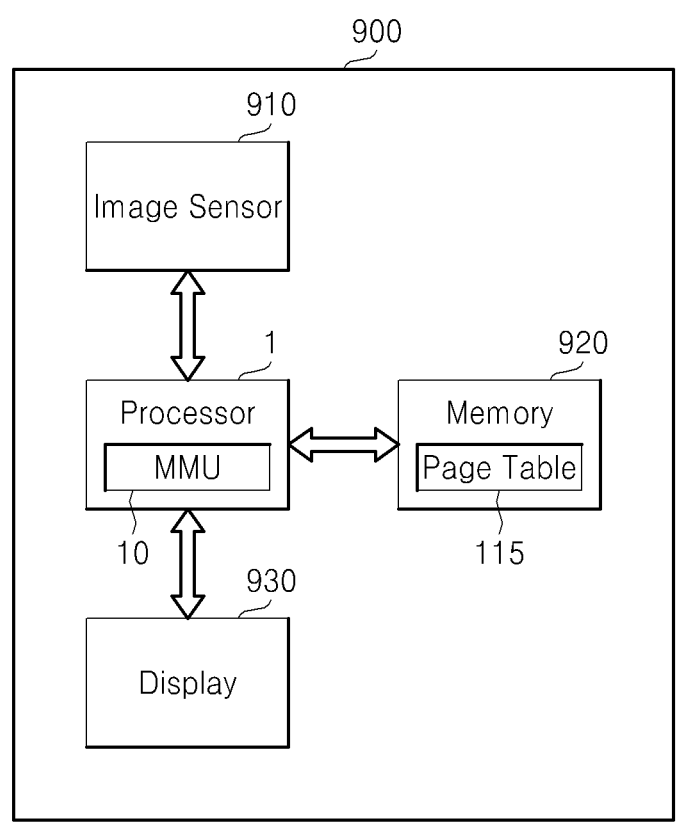
FIG. 9 is a block diagram illustrating yet another electronic device comprising a MMU according to an embodiment of the inventive concept.

FIG. 9 is a block diagram illustrating another electronic device 900 incorporating a processor 1 having an MMU 10 according to an embodiment of the inventive concept. Referring to FIG. 9, the electronic device 900 also comprises an image sensor 910 configured to convert an optical image to digital signals. The processor 1 processes digital signals converted based on a virtual address to generate data, converts the virtual address to a physical address using the MMU 10, and stores the data in the physical address of the memory 920.

The memory 920 includes the page table 115 to translate the virtual address into the physical address. Also, the data stored in the memory 920 is displayed through a display 930 under the control of the processor 1. That is, the processor 1 converts a virtual address to a physical address using the MMU 10, and accesses the physical address of the memory 920 to read the data stored in the physical address of the memory 920. The read data is displayed through the display 930.

A MMU according to various embodiments of the inventive concept operate in a manner that essentially hides "misses" in the translation of virtual addresses into physical addresses. As a result, the miss penalty typically associated with data processing may be at partially hidden.

While the inventive concept has been particularly shown and described with reference to exemplary embodiments thereof, it will be understood that various changes in form and details may be made therein without departing from the scope of the following claims.

What is claimed is:

1. A method of operating a memory management unit within a processor, the method comprising:
   providing a page table correlating a read virtual address with a corresponding read physical address for read data stored in a memory;
   during a read operation executed by the processor, receiving the read virtual address and accessing a translation lookaside buffer to determine whether the read virtual address matches the read physical address; and
   if the read virtual address matches the read physical address according to the translation lookaside buffer, providing the read physical address as a translation for the read virtual address,
   else if the read virtual address does not match the read physical address according to the translation lookaside buffer, storing the read virtual address in a first queue buffer and subsequently outputting the stored read virtual address from the first queue buffer, accessing the translation lookaside buffer using the read virtual address output by the first queue buffer to determine whether the read virtual address matches the read physical address according to the translation lookaside buffer, and upon determining that the read virtual address does not match the read physical address according to the translation lookaside buffer, accessing the page table using the read virtual address to determine a different read physical address, and outputting the different read physical address.

2. The method of claim 1, further comprising providing an access identification for another read virtual address having the same access identification as that of the read virtual address.

3. The method of claim 1, further comprising:
   providing the page table correlating a write virtual address with a corresponding write physical address for write data to be stored in the memory;

during write operation executed by the processor, receiving the write virtual address and determining whether the write virtual address matches the write physical address; and if the write virtual address matches the write physical address, providing the write physical address as a translation for the write virtual address, else if the write virtual address does not match the write physical address, storing the write virtual address in a second queue buffer, and providing a different write physical address in response to the queued write virtual address being used to access the page table.

4. The method of claim 1, wherein the memory is located outside of the processor.

5. A memory management unit comprising:
a first translation lookaside buffer lookup circuit configured to provide either a first virtual address among a plurality of virtual addresses or a first physical address corresponding to the first virtual address among a plurality of physical addresses, based on a determination whether a page number of the first virtual address matches a frame number of the first physical address;
a first queue buffer configured to store the first virtual address; and
a second translation lookaside buffer lookup circuit configured to receive the first virtual address from the first queue buffer, determine a first page physical address using the first virtual address received from the first queue buffer to access a page table stored in memory, and output the first page physical address to the memory via a bus to read the frame number,
wherein the page table correlates each of the plurality of virtual addresses with each corresponding physical address.

6. The memory management unit of claim 5, wherein the second translation lookaside buffer lookup circuit is configured to access a translation lookaside buffer using the first virtual address received from the first queue buffer to determine whether the page number of the first virtual address received from the first queue buffer matches the frame number of the first physical address.

7. The memory management unit of claim 5, wherein the first queue buffer is configured to store and provide an access identification for a second virtual address having the same access identification as that of the first virtual address.

8. The memory management unit of claim 5 further comprising:
a third translation lookaside buffer lookup circuit configured to provide either a first write virtual address among a plurality of write virtual addresses or a first write physical address corresponding to the first write virtual address among a plurality of write physical addresses, based on a determination whether a page number of the first write virtual address matches a frame number of the first write physical address;
a second queue buffer configured to store and provide the first write virtual address; and
a fourth translation lookaside buffer lookup circuit configured to determine and provide a first write page physical address using the first write virtual address to access the page table when the page number of the first write virtual address does not match the frame number of the first write physical address.

9. The memory management unit of claim 8 further comprising a selector configured to select and provide one of the first physical address, the first page physical address and the first write page physical address in response to a selection signal.

10. The memory management unit of claim 8, wherein the second queue buffer configured to store and provide an access identification of a second write virtual address having the same access identification as that of the first write virtual address.

11. The memory management unit of claim 10, wherein the fourth translation lookaside buffer lookup circuit is configured to translate the second write virtual address into a second write physical address and provide the second write physical address when a page number of the second write virtual address matches a frame number of the second write physical address.

12. The memory management unit of claim 11 further comprising a first selector configured to select and provide either the first write physical address or the second write physical address in response to a selection signal.

13. The memory management unit of claim 12 further comprising:
a demultiplexer configured to provide write data as first write data or as second write data in response to a first control signal provided by the third translation lookaside buffer lookup circuit;
a third queue buffer configured to store and provide the first write data; and
a second selector configured to provide the first write data provided by the third queue buffer or the second write data in response to a second control signal provided by the first selector.

14. A processor comprising:
a central processing unit (CPU) configured to output a plurality of virtual addresses including a first virtual address;
a hardware unit configured to provide the first virtual address; and
a memory management unit configured to translate the first virtual address into a corresponding first physical address, the memory management unit comprising:
a first translation lookaside buffer lookup circuit configured to provide either the first virtual address among a plurality of virtual addresses or a first physical address corresponding to the first virtual address among a plurality of physical addresses, based on a determination whether a page number of the first virtual address matches a frame number of the first physical address;
a first queue buffer configured to store the first virtual address; and
a second translation lookaside buffer lookup circuit configured to receive the first virtual address from the first queue buffer, determine a first page physical address using the first virtual address received from the first queue buffer to access a page table stored in a memory, and output the first page physical address to the memory via a bus to read the frame number,
wherein the page table correlates each of the plurality of virtual addresses with each corresponding physical address.

15. The processor of claim 14, wherein the hardware unit comprises at least one unit among a central processing unit, a system peripheral unit, a multimedia acceleration unit, a connectivity unit and a display controller.

16. The processor of claim 14, wherein the memory is located outside of the processor.

17. A method of operating a memory management unit comprising:
providing a page table stored in a memory, the page table correlating a virtual address with a corresponding physical address;
during an operation executed by a processor, receiving the virtual address and accessing a translation lookaside buffer to determine whether the virtual address matches the physical address; and
if, according to the translation lookaside buffer, the virtual address matches the physical address, providing by a first translation lookaside buffer looking circuit the physical address as a translation for the virtual address,
if, according to the translation lookaside buffer, the virtual address does not match the physical address, storing the virtual address in a queue buffer, subsequently outputting the stored virtual address to a second translation lookaside buffer looking circuit from the queue buffer, determining a first page physical address using the outputted virtual address to access the page table and outputting by the second translation lookaside buffer looking circuit the corresponding physical address to the memory via a bus to read a frame number of the physical address.

18. The method of claim 17, wherein the operation executed by the processor is a read operation.

19. The method of claim 17, wherein the operation executed by the processor is a write operation.

20. The method of claim 17, wherein the memory is located outside of the processor.

21. The method of claim 17, wherein, if, according to the translation lookaside buffer, the virtual address does not match the physical address, accessing the translation lookaside buffer using the virtual address stored in the queue buffer to determine whether the virtual address matches the physical address is performed.

22. A system comprising:
a memory device including a page table; and
a processor comprising:
a central processing unit (CPU) configured to output a plurality of virtual addresses including a first virtual address;
a hardware unit configured to provide the first virtual address; and
a memory management unit configured to translate the first virtual address into a corresponding first physical address, the memory management unit comprising:
a first translation lookaside buffer lookup circuit configured to provide either the first virtual address among a plurality of virtual addresses or a first physical address corresponding to the first virtual address among a plurality of physical addresses, based on a determination whether a page number of the first virtual address matches a frame number of the first physical address;
a first queue buffer configured to store the first virtual address; and
a second translation lookaside buffer lookup circuit configured to receive the first virtual address from the first queue buffer, determine a first page physical address using the first virtual address received from the first queue buffer to access the page table, and output the first page physical address to the memory device via a bus to read the frame number,
wherein the page table correlates each of the plurality of virtual addresses with each corresponding physical address.

23. The system of claim 22, wherein the memory device and the processor are two separate components.

24. The system of claim 22, wherein the memory device is a nonvolatile memory.

25. The system of claim 22, wherein the memory device is a volatile memory.

26. An electronic device comprising:
an input device;
a display;
a memory device including a page table; and
a processor comprising:
a central processing unit (CPU) configured to output a plurality of virtual addresses including a first virtual address;
a hardware unit configured to provide the first virtual address; and
a memory management unit configured to translate the first virtual address into a corresponding first physical address, the memory management unit comprising:
a first translation lookaside buffer lookup circuit configured to provide either the first virtual address among a plurality of virtual addresses or a first physical address corresponding to the first virtual address among a plurality of physical addresses, based on a determination whether a page number of the first virtual address matches a frame number of the first physical address;
a first queue buffer configured to store the first virtual address; and
a second translation lookaside buffer lookup circuit configured to receive the first virtual address from the first queue buffer, determine a first page physical address using the first virtual address received from the first queue buffer to access the page table, and output the first page physical address to the memory via a bus to read the frame number,
wherein the page table correlates each of the plurality of virtual addresses with each corresponding physical address.

27. The electronic device of claim 26 further comprising a mobile power source.

28. The electronic device of claim 26, wherein the electronic device is a mobile device.

29. The electronic device of claim 26, wherein the memory device and the processor are two separate components.

* * * * *